United States Patent
Kudoh

(10) Patent No.: US 10,473,885 B2
(45) Date of Patent: Nov. 12, 2019

(54) LENS BARREL WITH COLLAPSIBLE LENS GROUPS, AND IMAGE PICKUP APPARATUS

(71) Applicant: CANON KABUSHIKI KAISHA, Tokyo (JP)

(72) Inventor: Tomoyuki Kudoh, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/405,657

(22) Filed: Jan. 13, 2017

(65) Prior Publication Data

US 2017/0205602 A1 Jul. 20, 2017

(30) Foreign Application Priority Data

Jan. 15, 2016 (JP) ................. 2016-006093

(51) Int. Cl.
*G02B 7/10* (2006.01)
*G02B 7/02* (2006.01)
*G02B 15/14* (2006.01)

(52) U.S. Cl.
CPC .............. *G02B 7/10* (2013.01); *G02B 7/023* (2013.01); *G02B 7/102* (2013.01); *G02B 15/14* (2013.01)

(58) Field of Classification Search
CPC .......... G02B 7/021; G02B 7/023; G02B 7/10; G02B 15/14; G11B 7/0932; G11B 7/0933; G11B 7/0935
USPC ............ 359/669–701, 813, 817, 694; 396/73
See application file for complete search history.

(56) References Cited

U.S. PATENT DOCUMENTS

2014/0307331 A1* 10/2014 Kudoh ................. G02B 13/009
359/700

FOREIGN PATENT DOCUMENTS

| CN | 101246244 A | 8/2008 |
| CN | 101630111 A | 1/2010 |
| CN | 104111512 A | 10/2014 |
| CN | 104849827 A | 8/2015 |
| JP | 2010-262107 A | 11/2010 |
| JP | 2012-042649 A | 3/2012 |

OTHER PUBLICATIONS

The above foreign patent documents were cited in a Aug. 5, 2019 Chinese Office Action, which is enclosed with an English Translation, that issued in Chinese Patent Application No. 201710022743.2.

* cited by examiner

*Primary Examiner* — Marin Pichler
(74) *Attorney, Agent, or Firm* — Cowan, Liebowitz & Latman, P.C.

(57) ABSTRACT

A lens barrel which reliably retracts a retractable lens group without increasing thickness in a direction of an optical axis before an adjoining lens group is housed. A first lens holding member holds a first lens. A cam cylinder drives the first holding member along the optical axis. At a shooting position, the second holding member that holds a second lens lies on an optical axis, and at a collapsed position, the second holding member retracts to a retracted position by engaging with a moving member that moves toward the image plane in response to movement of the cam cylinder toward the image plane. The cam cylinder has a cam groove, on which the first holding member moves toward a subject before the second holding member starts retracting in a process of shifting from the shooting position to the collapsed position.

11 Claims, 11 Drawing Sheets

LENS BARREL WITH COLLAPSIBLE LENS GROUPS, AND IMAGE PICKUP APPARATUS

BACKGROUND OF THE INVENTION

Field of the Invention

The present invention relates to a lens barrel with collapsible lens groups, and an image pickup apparatus.

Description of the Related Art

Image pickup apparatuses such as cameras and video cameras have lately increased in magnification and decreased in size. Accordingly, some lens barrels provided in image pickup apparatuses are configured to collapse lens groups. Namely, when shooting is not performed, at least some lens groups in a lens barrel collapse while retracting from an area on a shooting optical axis, and when shooting is to be performed, the lens groups are extended from a camera casing so that the distances between the lens groups can be suitable for shooting.

A lens barrel according to Japanese Laid-Open Patent Publication (Kokai) No. 2012-042649 retracts a focus lens group when an image pickup apparatus which is a camera is brought from a shooting state to a collapsed state, so that the length of collapsing when housing into the lens barrel can be reduced to make the image pickup apparatus smaller. Also, a lens barrel according to Japanese Laid-Open Patent Publication (Kokai) No. 2010-262107 mechanically inhibits movement of a lens to be inserted until retractable lenses have been completely retracted. After the retractable lenses have been completely retracted, the lens is inserted.

Conventional lens barrels are generally configured to retract a retractable lens group while moving the whole lens groups in a housing direction. In this case, allowance needs to be made for the layout and operation of the lens groups in the direction of the optical axis, and there is scope of improvement for efficient shifting to a collapsed state and reduction of the thickness of a lens barrel. According to Japanese Laid-Open Patent Publication (Kokai) No. 2012-042649 as well, a lens group that is located lateral to a retracted focus lens group when a lens barrel is collapsed simply moves in one direction in a direction of an optical axis during shifting to a collapsed state. It is thus necessary to allow leeway for distances between lens groups so as to prevent interference between them so that the lens groups can be put at retracted positions after the focus lens group is completely retracted.

Moreover, according to Japanese Laid-Open Patent Publication (Kokai) No. 2012-042649, the focus lens group is retracted to an outer side of the outermost diameter of the lens barrel, and hence not only the lens barrel is large in size, but also the reliability may be lowered in terms of strength and environmental resistance due to a hole for retraction formed in a side face of the lens barrel. Further, a driving source for zooming and a driving source for retracting the focus lens group are provided independently, which makes the arrangement of the lens barrel complicated.

On the other hand, according to Japanese Laid-Open Patent Publication (Kokai) No. 2010-262107, a mechanical component for inhibiting movement of a lens to be inserted by mechanically stopping it in an engaged state is required, and this not only makes the arrangement of the lens barrel complicated but also may cause a load put by the stopping action to affect the lens barrel. For this reason, an arrangement that efficiently brings a retractable lens group and an inserted lens group into a collapsed state without increasing the load on a lens barrel or increasing its overall size is demanded.

SUMMARY OF THE INVENTION

The present invention provides a lens barrel and an image pickup apparatus which reliably retract a retractable lens group without increasing thickness in a direction of an optical axis before an adjoining lens group is housed.

Accordingly, the present invention provides a lens barrel comprising a first holding member configured to hold a first lens, a cam cylinder configured to drive the first holding member in a direction of an optical axis by a cam mechanism, and a second holding member configured to hold a second lens disposed closer to an image plane than the first lens, wherein at a shooting position, the second holding member lies on the optical axis, and at a collapsed position, the second holding member retracts to a retracted position away from the optical axis in a direction perpendicular to the optical axis by engaging with a moving member that moves toward the image plane in response to movement of the cam cylinder toward the image plane, and wherein a cam groove, on which the first holding member moves toward a subject relatively to the cam cylinder before the second holding member starts retracting to the retracted position in a process of shifting from the shooting position to the collapsed position, is formed on the cam cylinder.

According to the present invention, a retractable lens group is reliably retracted without increasing thickness in a direction of an optical axis before an adjoining lens group is housed.

Further features of the present invention will become apparent from the following description of exemplary embodiments (with reference to the attached drawings).

DESCRIPTION OF THE EMBODIMENTS

Hereafter, an embodiment of the present invention will be described in detail with reference to the drawings.

Figure 1A:
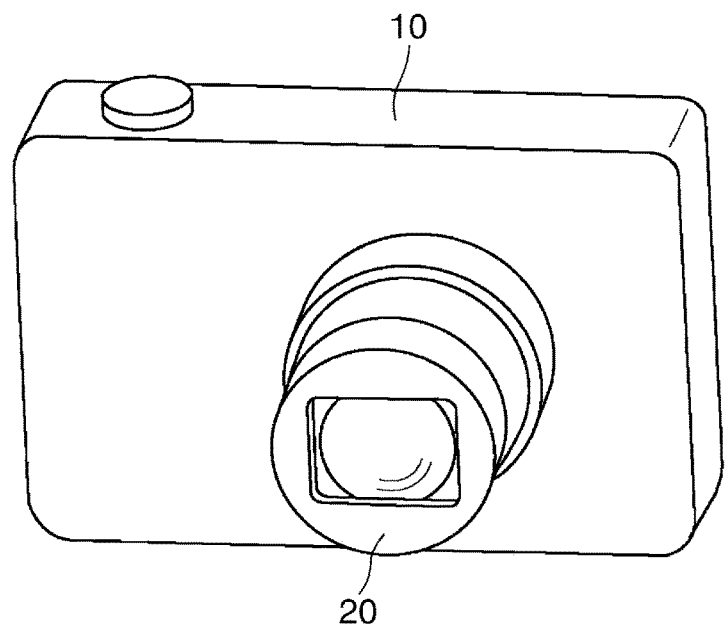
FIG. 1A is a perspective view showing an image pickup apparatus.
Figure 1B:
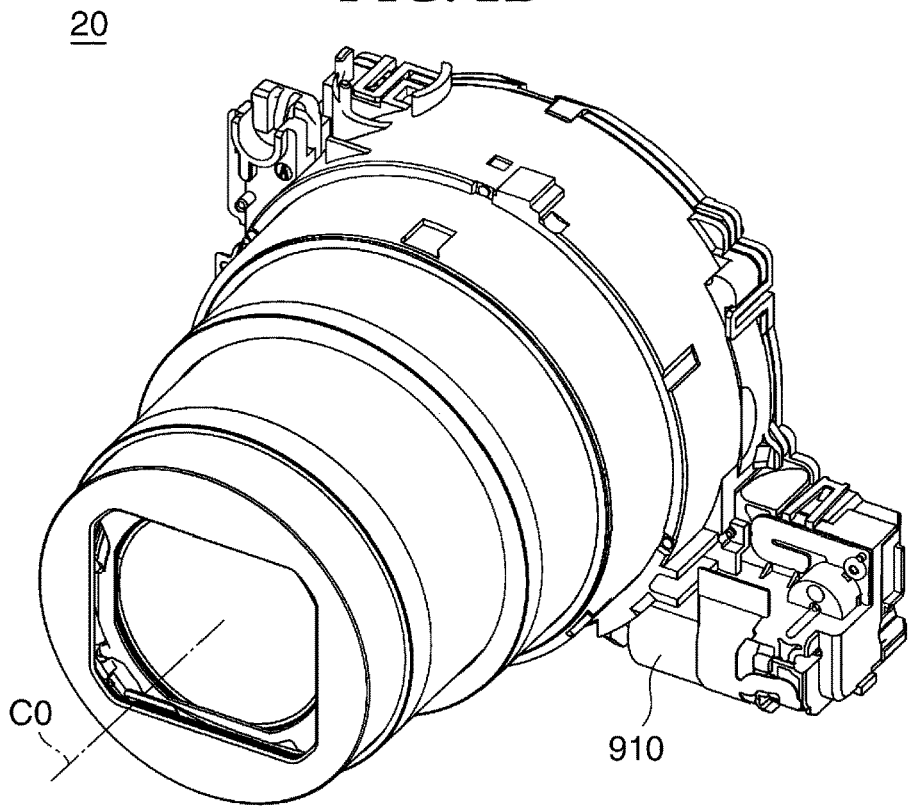
FIG. 1B is a perspective view showing a lens barrel.

FIG. 1A is a perspective view showing an image pickup apparatus with a lens barrel according to an embodiment of the present invention. This image pickup apparatus is configured as, for example, a digital camera, but may be other optical equipment such as a video camera. FIG. 1B is a perspective view showing the lens barrel mounted on the image pickup apparatus according to the present embodiment. The image pickup apparatus according to the present embodiment has a camera main body 10, and a zoom-type lens barrel 20 is provided on a front side (subject side) of the camera main body 10. The lens barrel 20 is configured such that its shooting optical system is moved in a direction of a shooting optical axis between a shooting position and a collapsed position by a zoom drive unit 910 to change shooting magnifications. The shooting optical axis is an optical axis C0 in FIG. 1B. As for a longitudinal direction of the lens barrel 20, a subject side of the lens barrel 20 is referred to as a front side, and an opposite side of the lens barrel 20 is referred to as a rear side.

Figure 2:
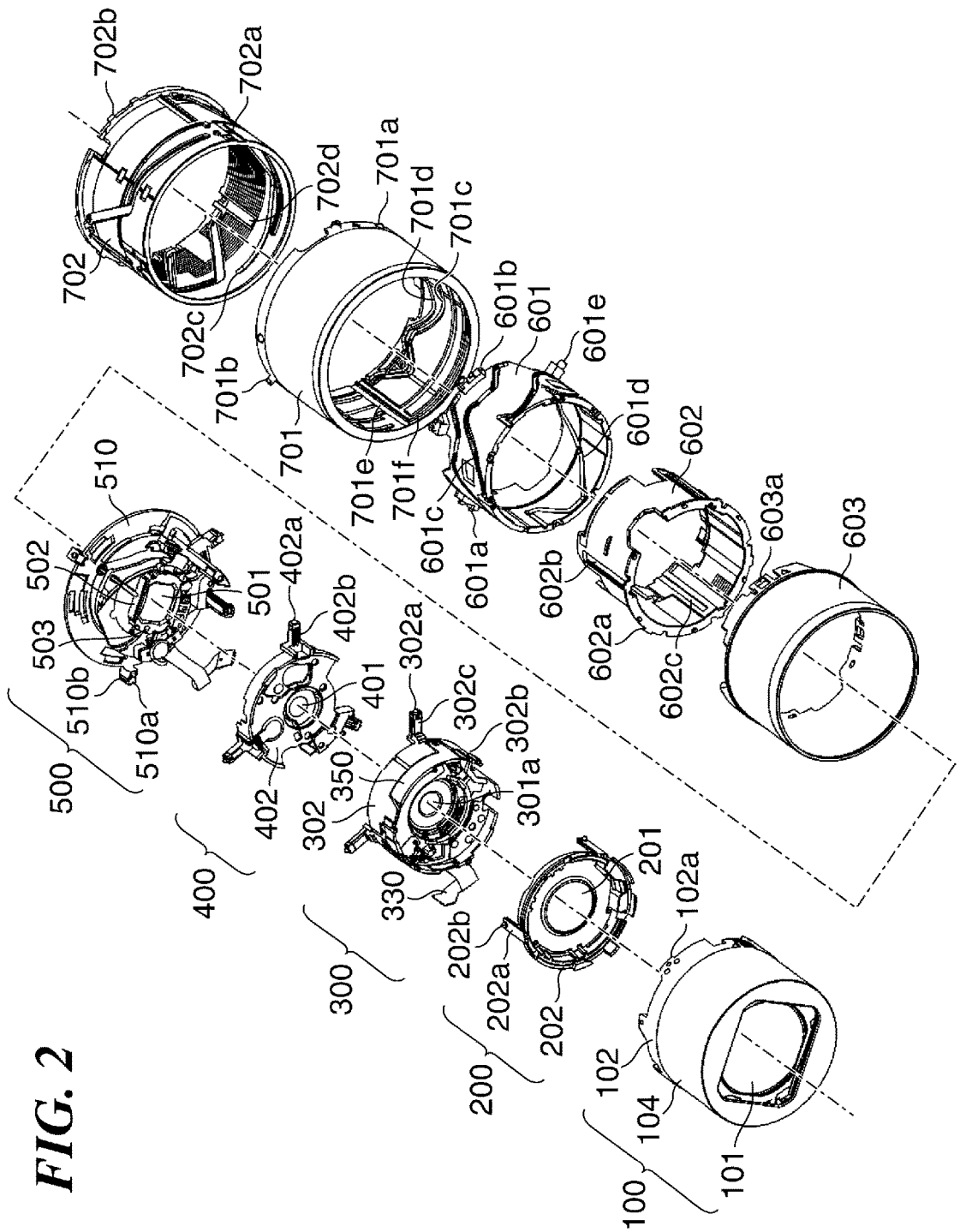
FIG. 2 is an exploded perspective view showing a part of the lens barrel.
Figure 3:
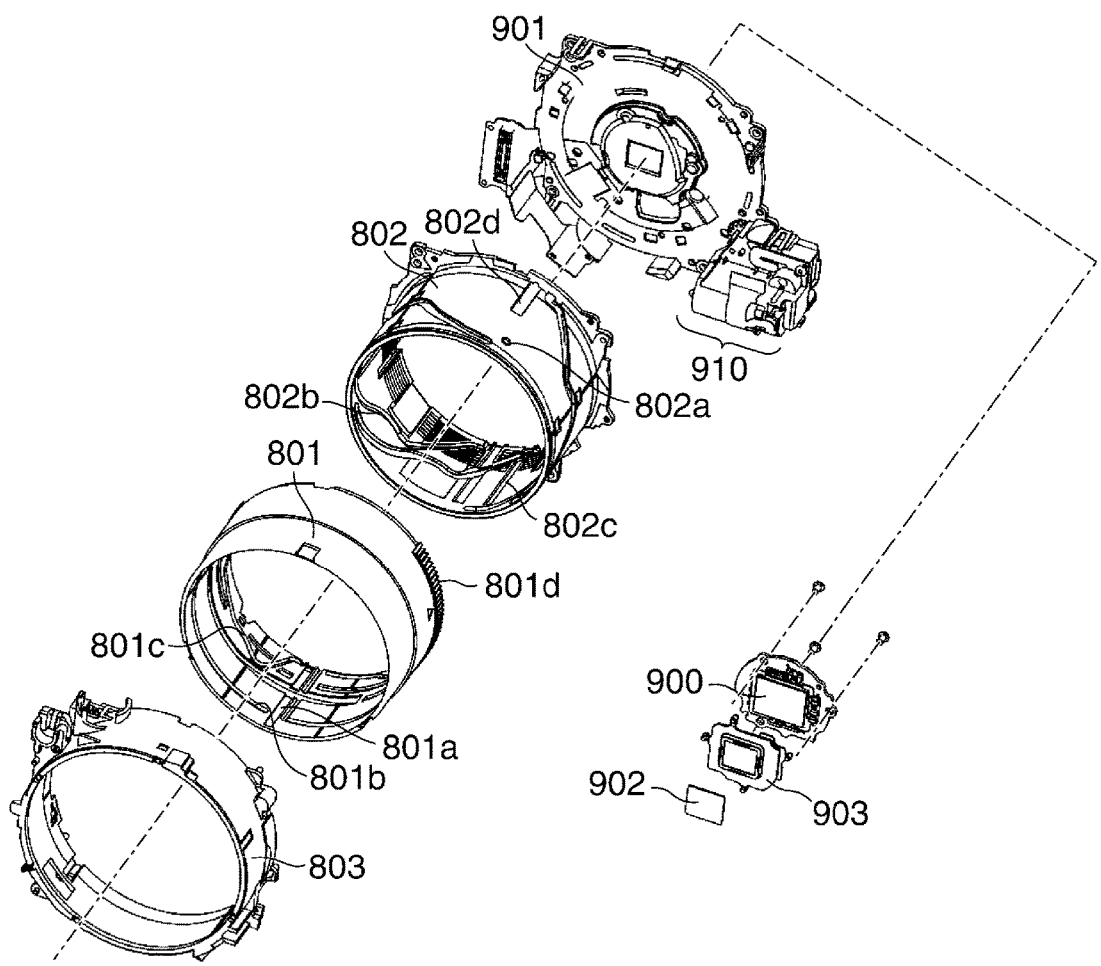
FIG. 3 is an exploded perspective view showing a part of the lens barrel.
Figure 4:
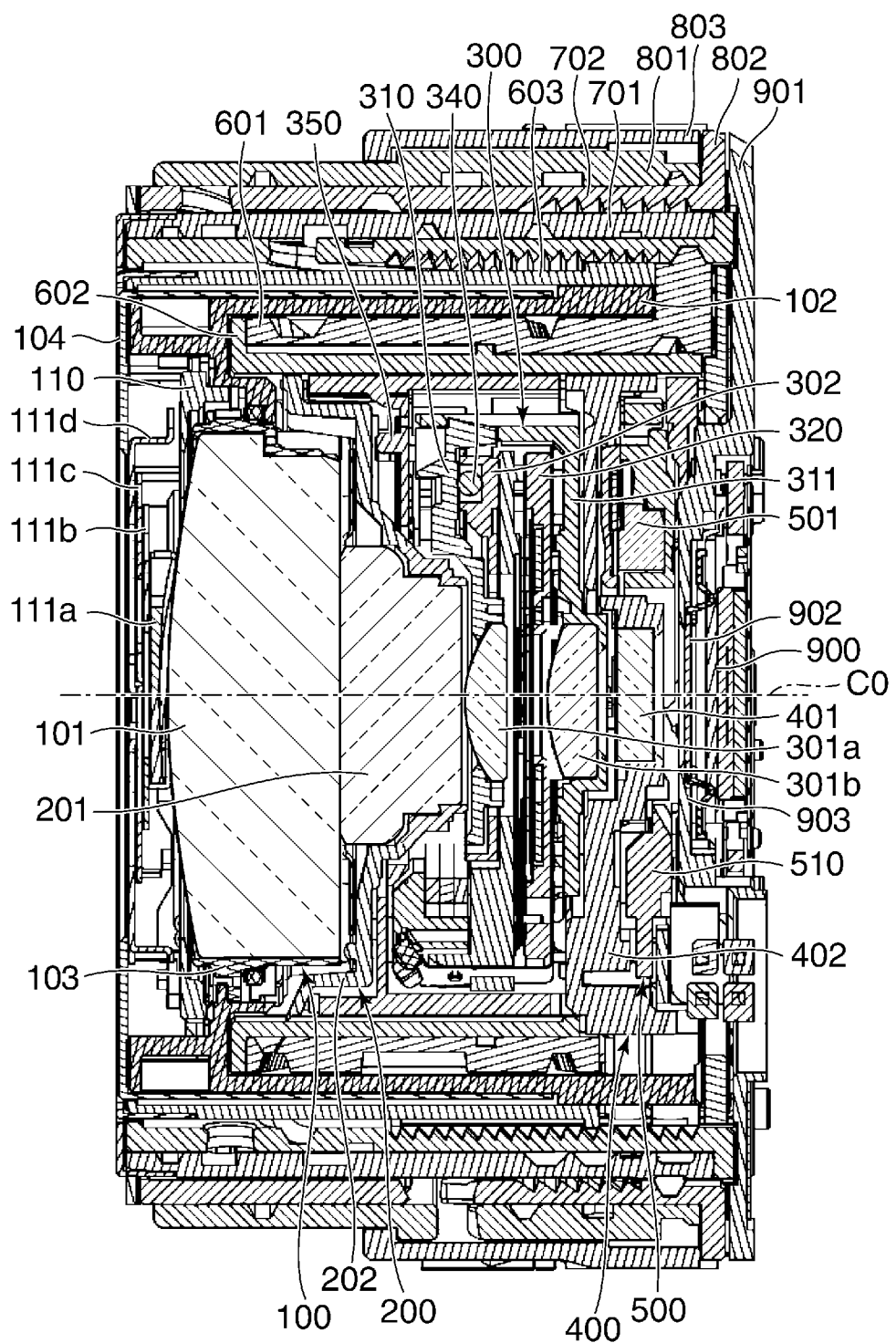
FIG. 4 is a cross-sectional view showing the lens barrel in a collapsed state.
Figure 5:
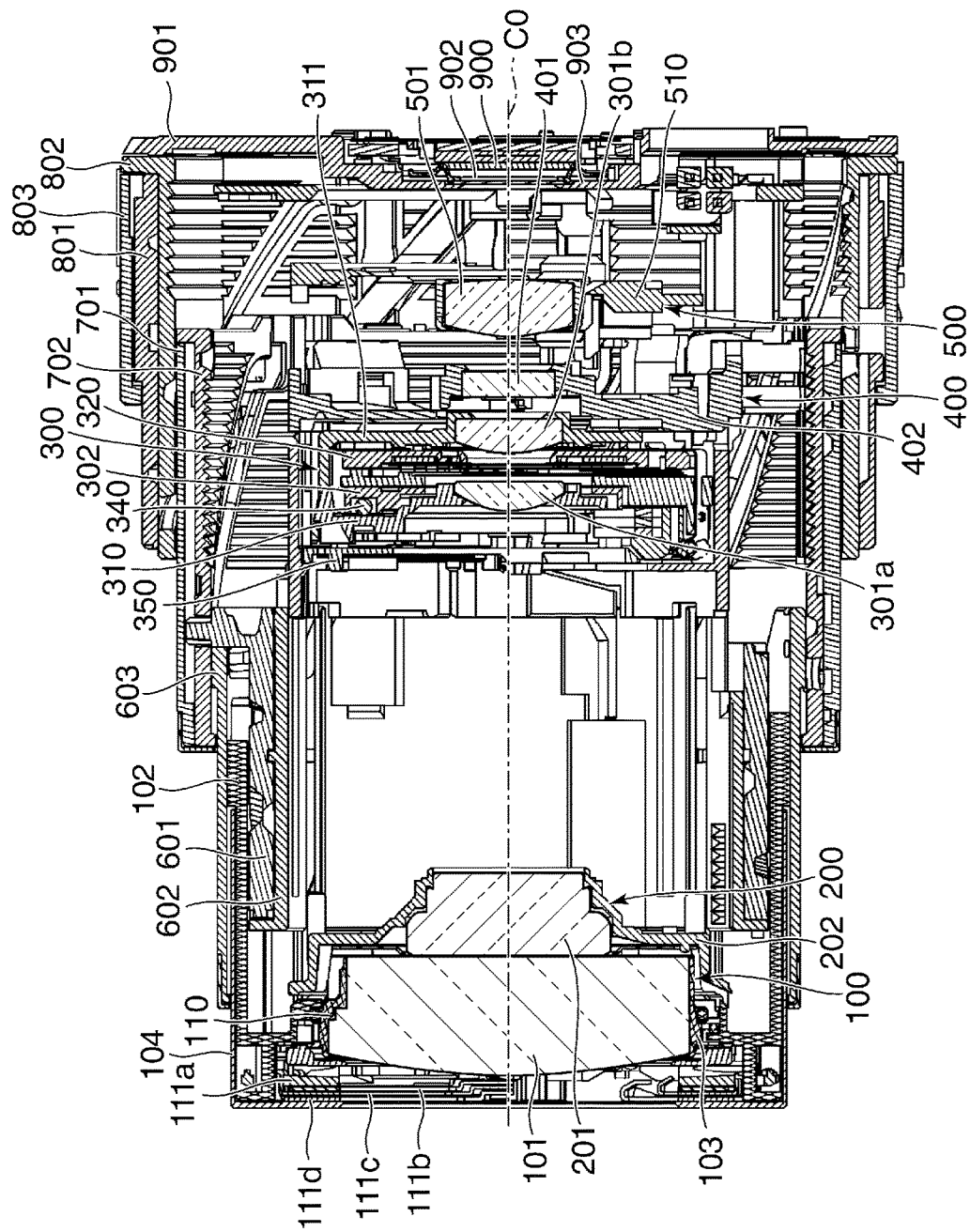
FIG. 5 is a cross-sectional view showing the lens barrel in a shooting state.

FIGS. 2 and 3 are exploded perspective views showing the lens barrel 20. FIG. 4 and FIG. 5 are cross-sectional views showing the lens barrel 20 in a collapsed state and a shooting state, respectively. An arrangement of the lens barrel 20 will now be described with reference to FIGS. 2 to 5.

As shown in FIGS. 2 and 3, the shooting optical system of the lens barrel 20 has a first lens group 100 with a group-1 lens 101, a second lens group 200 with a group-2 lens 201, a third lens group 300 with group-3 lenses 301a and 301b (see FIGS. 4 and 5). The shooting optical system also has a fourth lens group 400 with a group-4 lens 401, and a fifth lens group 500 with a group-5 lens 501.

An inner cam cylinder 601 rotatably holds, on an inner peripheral side thereof, a first straight advance cylinder 602 by bayonet coupling. A cam groove 601d, on which a follower 202a of a group-2 lens frame 202 is fitted, is provided on the inner cam cylinder 601. A follower 601a, which is fitted on a cam groove 702c of a second straight advance cylinder 702, an engaging portion 601b, which is engaged with an engaging portion 603a of an inner cam cover 603, and a driven pin 601e, which is fitted on a drive groove 701e of an outer can cylinder 701 are provided in an outer peripheral portion of the inner cam cylinder 601. A cam groove 601c, on which a follower 102a of a group-1 lens barrel 102 constituting a part of the first lens group 100 is fitted, is also provided in the outer peripheral portion of the inner cam cylinder 601. The engaging portion 603a, which is engaged with the engaging portion 601b of the inner cam cylinder 601, is provided in an outer peripheral portion of the inner cam cover 603, which is mounted on the inner cam cylinder 601.

A straight advance key 602a, which is fitted on a straight advance groove (not shown) provided inside the group-1 lens barrel 102, is provided in an outer peripheral portion of the first straight advance cylinder 602. A straight advance groove 602b, on which a straight advance key 202b of the group-2 lens frame 202 is fitted, and a straight advance groove 602c, with which a straight advance key 302b of the group-3 base 302 is engaged, are provided in an inner peripheral portion of the first straight advance cylinder 602. The outer can cylinder 701 has in an inner peripheral portion thereof a cam groove 701f, on which a follower 702a of the second straight advance cylinder 702 is fitted. A follower 701a, which is fitted on a cam groove 802b of a fixed cylinder 802, and a driven pin 701b, which is fitted on a drive groove 801a of a rotary cylinder 801 are provided in an outer peripheral portion of the outer cam cylinder 701. A cam groove 701c, on which a follower 302a of the group-3 base 302 is fitted, a cam groove 701d, on which a follower 402a of a group-4 lens frame 402 is fitted, and a drive groove 701e, on which the driven pin 601e of the inner cam cylinder 601 is fitted, are provided in an inner peripheral portion of the outer cam cylinder 701.

A straight advance key 702b, which is fitted on a straight advance groove 802c of the fixed cylinder 802, and the follower 702a, which is fitted on the cam groove 701f of the outer cam cylinder 701, are provided in an outer peripheral portion of the second straight advance cylinder 702. A straight advance groove 702d, on which the straight advance key 402b of the group-4 lens frame 402 is fitted, and a straight advance groove 702c, on which the follower 601a of the inner cam cylinder 601 is fitted, are provided in an inner peripheral portion of the second straight advance cylinder 702. The straight advance groove 702d, on which a straight advance key 302c of the group-3 base 302 is fitted, is also provided in the inner peripheral portion of the second straight advance cylinder 702.

A follower 802a, which is fitted on a cam groove 801b of the rotary cylinder 801, is provided in an outer peripheral portion of the fixed cylinder 802. A straight advance groove 802d, on which a straight advance key 501b of a group-5 base 510 is fitted, a straight advance groove 802c, on which the straight advance key 702b of the second straight advance cylinder 702 is fitted, and the cam groove 802b, on which the follower 701a of the outer cam cylinder 701 is fitted, are provided in an inner peripheral portion of the fixed cylinder 802. A gear portion 801d, which is connected to a zoom drive unit 810, is provided in an outer peripheral portion of the rotary cylinder 801. The cam groove 801b, on which the follower 802a of the fixed cylinder 802 is fitted, a drive groove 801a, on which the driven pin 701b of the outer cam cylinder 701 is fitted, and a cam groove 801c, on which follower 510a of the group-5 base 510 is fitted, are provided in an inner peripheral portion of the rotary cylinder 801. A cover cylinder 803 is placed on an outer peripheral side of the rotary cylinder 801, the fixed cylinder 802 is placed on an inner peripheral side of the rotary cylinder 801, and the rotary cylinder 801 is fixed to a sensor holder 901.

As shown in FIGS. 4 and 5, the first lens group 100 has a barrier mechanism. The first lens group 100 has a group-1 lens frame 103, which holds the group-1 lens 101, the group-1 lens barrel 102, a group-1 cap 104, and so forth. The first lens group 100 also has a barrier drive ring 110, a plurality of barrier blades 111a, 111b, 111c, and 111d, and a barrier spring (not shown). A straight advance groove (not shown), on which the straight advance key 602a of the first straight advance cylinder 602 is fitted, and the follower 102a, which is fitted on the cam groove 601c of the inner cam cylinder 601 are provided in an inner peripheral portion of the group-1 lens barrel 102 (FIG. 2). The second lens group 200 is comprised of the group-2 lens 201, the group-2 lens frame 202, and so forth. The second lens group 200 has the follower 102a, which is fitted on the cam groove 601d of the inner cam cylinder 601, and the straight advance key 202b, which is fitted on the straight advance groove 602b of the first straight advance cylinder 602 (FIG. 2).

Figure 9A:
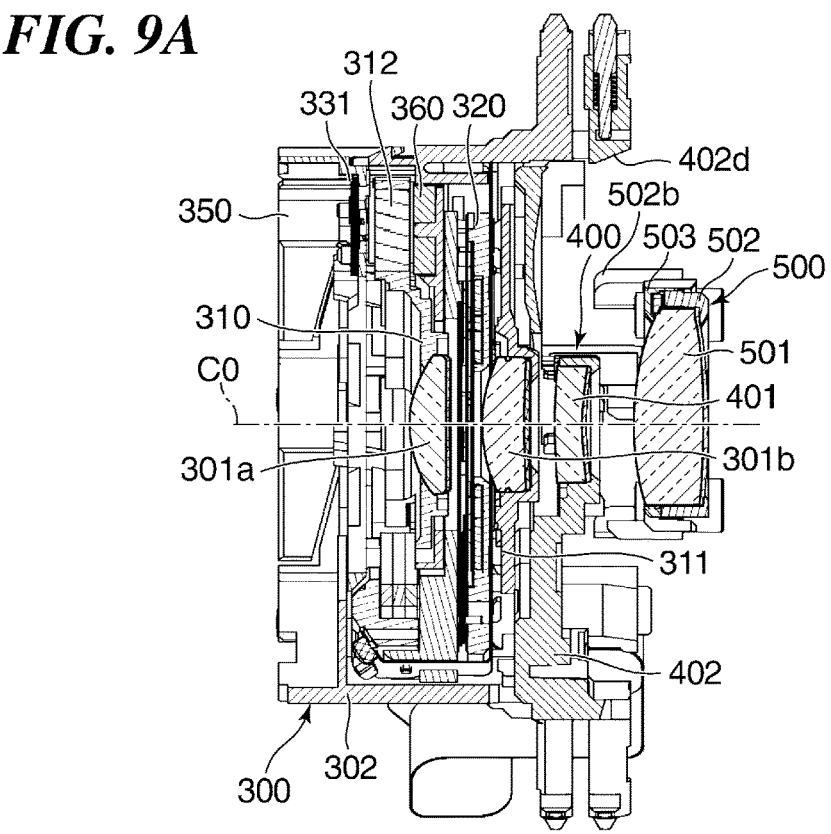
FIGS. 9A and 9B are a cross-sectional view and a rear view, respectively, showing third to fifth lens groups in a shooting state.

The third lens group 300 has an image stabilization mechanism and a shutter-diaphragm unit 320. The group-3 base 302 has a straight advance key 302b, which is fitted on the straight advance groove 602c of the first straight advance cylinder 602, and the follower 302a, which is fitted on the cam groove 701c of the outer cam cylinder 701 (FIG. 2). Group-3 lens frames 310 and 311 hold the group-3 lenses 301a and 301b, respectively. A pair of IS magnets 312 is held by the group-3 lens frame 310, and the group-3 lens frame 310 and the group-3 lens frame 311 are placed in a manner sandwiching the shutter-diaphragm unit 320 (see FIG. 9A and FIG. 10A). A pair of IS coils 360 is fixed to the group-3 base 302 such that the IS coils 360 are opposed to the IS magnets 312 (see FIG. 9A and FIG. 10A). The group-3 base 302 holds the group-3 lens frame 310 through a plurality of IS balls 340 (FIGS. 4 and 5) using tension of an IS spring (not shown) such that the group-3 lens frame 310 is movable within a plane perpendicular to the optical axis C0. On a subject side of the IS magnets 312, a pair of Hall elements 331 held by an FPC 330 (FIG. 2) is held by an IS sensor holder 350 such that the Hall elements 331 are opposed to the IS magnets 312 (FIG. 9A). Lorentz force is caused to act between the group-3 lens frames 310 and 311 and the IS magnets 312 by passage of electric current through the IS coils 360 via the FPC 330. As a result, the group-3 lens frames 310 and 311 move inside an plane perpendicular to the optical axis C0, and their positions are controlled by the Hall elements 331 to prevent camera shake.

As shown in FIG. 2, the fourth lens group 400 has the group-4 lens 401, the group-4 lens frame 402, and so forth. The group-4 lens frame 402 has the follower 402a, which is fitted on the cam groove 701d of the outer cam cylinder 701, and the straight advance key 402b, which is fitted on the straight advance groove 702d of the second straight advance cylinder 702. The forth lens group 400 is an adjoining lens group that adjoins a retractable lens group 500a, to be described later, on the optical axis C0 in a shooting state. The fourth lens group 400 is a unit that, in a collapsed state, goes in a lateral side of the retractable lens group 500a that has been retracted, and hence the fourth lens group 400 is referred to as an "inserted lens group". The sensor holder 901 holds the zoom drive unit 910 and also holds an optical element 902, a sensor rubber 903, and an image pickup element 900.

Figure 6:
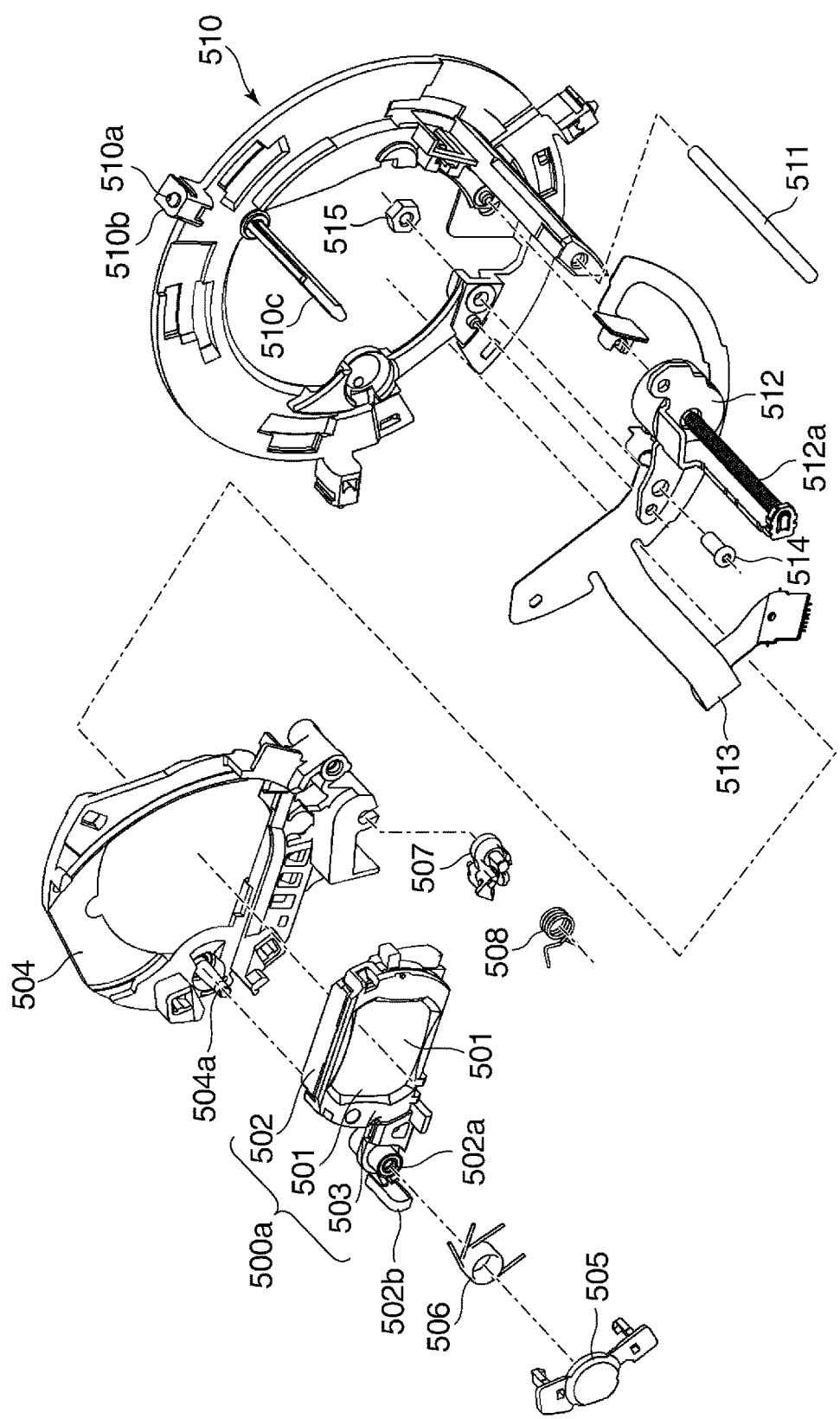
FIG. 6 is an exploded perspective view showing a fifth lens group

FIG. 6 is an exploded perspective view showing the fifth lens group 500. The fifth lens group 500 has a focusing mechanism. As shown in FIG. 6, the fifth lens group 500 has the retractable lens group 500a, an AF base 504, an AF cover 505, an AF spring 506, a rack 507, and a rack spring 508. The retractable lens group 500a is an optical element located closest to the image pickup element 900 in the shooting optical system in a shooting state. The fifth lens group 500 also has the group-5 base 510, a main guide 511, a focus motor 512, an FPC 513, a screw 514, a nut 515, and so forth. The retractable lens group 500a is constructed by the group-5 lens 501 being held by a group-5 lens frame 502 and a group-5 cover 503. The AF cover 505 is mounted on the AF base 504, which is a supporting member, so as to urge the group-5 lens frame 502 in an optical axis direction (the direction of the optical axis C0) via the AF spring 506.

The AF base 504 holds the rack 507 and the rack spring 508 and holds the group-5 lens frame 502 such that the group-5 lens frame 502 is rotatable in a direction of a plane perpendicular to the optical axis C0 (around the optical axis C0). Namely, first, a rotation shaft 504a of the AF base 504 is inserted into a supporting hole 502a of the group-5 lens frame 502. The retractable lens group 500a is rotatable with respect to the AF base 504 about a center of rotation which is an axis of rotation 504a1 (FIGS. 7A and 7C, FIGS. 8A and 8C) of the rotation shaft 504a. The rotation shaft 504a is eccentric from the optical axis C0. Around the axis of rotation 504a1, the AF spring 506 urges the retractable lens group 500a toward an initial position. The initial position of the retractable lens group 500a is a position that is assumed by the retractable lens group 500a in a shooting state and is a position at which an optical axis of the retractable lens group 500a alone corresponds to the optical axis C0 of the shooting optical system in a shooting state. A corner portion 502b, which is engaged with a cam portion 602x (for example, FIG. 7B) of the first straight advance cylinder 602 is formed on the group-5 lens frame 502 of the retractable lens group 500a. The first straight advance cylinder 602 is a driving portion, and the corner portion 502b is a driven portion.

The main guide 511 is pressed into the group-5 base 510, and the focus motor 512 to which the FPC 513 is connected is fixed to the group-5 base 510 by the screw 514 and the nut 515. The group-5 base 510 has a follower 501a, which is fitted on the cam groove 801c of the rotary cylinder 801, and a straight advance key 501b, which is fitted on the straight advance groove 802d of the fixed cylinder 802 (see FIG. 2 as well). The AF base 504 is inhibited from rotating by the main guide 511 and a sub guide 510c, which is provided in the group-5 base 510. The AF base 504 is allowed to be displaced in the direction of the optical axis, and when the focus motor 512 runs, the AF base 504 moves forward and backward to arbitrary positions in the direction of the optical axis C0 through feeding actions of a screw 512a and the rack 507.

A description will now be given of zoom drive by the lens barrel 20. When the rotary cylinder 801 is rotatively driven by the zoom drive unit 910, the outer cam cylinder 701 is caused to move in the direction of the optical axis C0 while rotating through actions of the rotary cylinder 801 and the fixed cylinder 802. Specifically, the outer cam cylinder 701 rotates through engagement of the drive groove 801a and the driven pin 701b and is displaced in the direction of the optical axis through engagement of the cam groove 802b and the follower 701a.

The inner cam cylinder 601 is rotatable with respect to the first straight advance cylinder 602, and the outer cam cylinder 701 is roratably held by the second straight advance cylinder 702. A unit comprised of the inner cam cylinder 601 and the first straight advance cylinder 602 connected together is referred to as an inner cam cylinder group, and a unit comprised of the outer cam cylinder 701 and the second straight advance cylinder 702 connected together is referred to as an outer cam cylinder group. When the outer cam cylinder 701 is rotatively driven by the rotary cylinder 801, the inner cam cylinder 601 is rotatively driven by the outer cam cylinder 701, and moreover, the first straight advance cylinder 602 and the second straight advance cylinder 702 are inhibited from rotating by the fixed cylinder 802 via the group-3 base 302. This causes the outer cam cylinder 701 and the inner cam cylinder 601 to move in the direction of the optical axis while rotating.

The first lens group 100 and the second lens group 200 are inhibited from rotating by the first straight advance cylinder 602 and caused to move straight in the direction of the optical axis by action of the inner can cylinder 601. The third lens group 300 and the fourth lens group 400 are inhibited from rotating by the second straight advance cylinder 702 and caused to move straight in the direction of the optical axis by action of the outer can cylinder 701. Specifically, when the outer can cylinder 701 rotates, the third lens group 300 is displaced in the direction of the optical axis through engagement of the cam groove 701c of the outer cam cylinder 701 and the follower 302a of the third lens group 300. The outer can cylinder 701 drives the fourth lens group 400 in the direction of the optical axis using a cam mechanism (engagement of the cam groove 701d of the outer cam cylinder 701 and the follower 402a of the fourth lens group 400). When bringing the third lens group 300 and the fourth lens group 400 from a shooting state into a retracted state, the cam grooves 701c and 701d act as retarding cams that temporarily move the third lens group 300 and the fourth lens group 400 forward in the direction of the optical axis (toward the subject) relatively to the outer cam cylinder 701 and then move them in a retracting direction (rearward in the direction of the optical axis). This action will be described later in detail with reference to FIG. 11.

The fifth lens group 500 has its group-5 base 510 inhibited from rotating by the fixed cylinder 802 and is caused to move straight in the direction of the optical axis by action of the rotary cylinder 801. The AF base 504 is inhibited from rotating by the main guide 511 and the sub guide 510c. The AF base 504 moves straight in the direction of the optical axis relatively to the group-5 base 510 through actions of the screw 512a and the rack 507 formed integrally with an output shaft of the focus motor 512 irrespective of actions of the rotary cylinder 801 and the fixed cylinder 802.

As a result of the actions described above, the rotary cylinder 801 is relatively driven by the zoom drive unit 910 to extend the lens groups, bringing the lens barrel 20 from a collapsed state into a shooting state. Moreover, the focus motor 512 is driven through the FPC 513 to extend the group-5 lens 501, which is a focus lens, to an arbitrary position.

Referring next to FIGS. 7A to 11, a description will be given mainly of the relationship between a retracting operation of the retractable lens group 500a and a straight advancing operation of the fourth lens group 400.

Figure 7A:
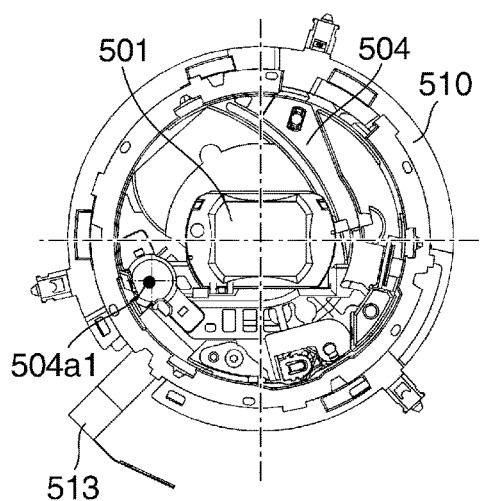
FIGS. 7A and 7C are front views showing a retractable lens group and a first straight advance cylinder.
Figure 7B:
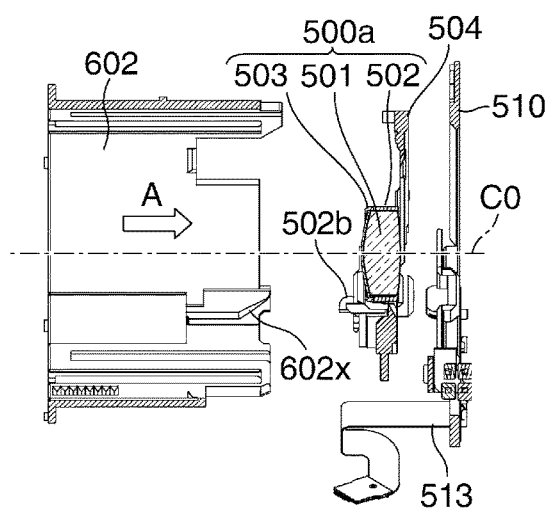
FIGS. 7B and 7D are longitudinal sectional views showing the retractable lens group and the first straight advance cylinder.
Figure 7C:
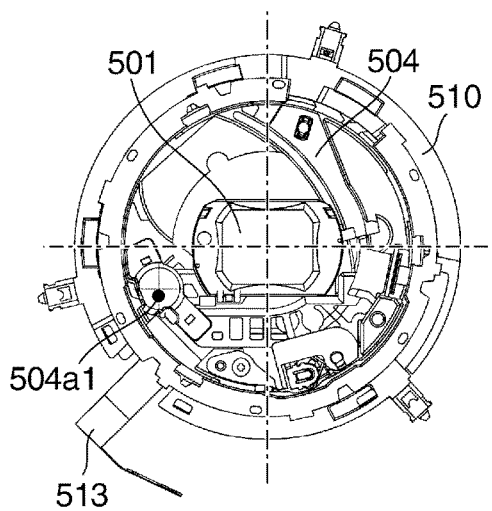
Figure 7D:
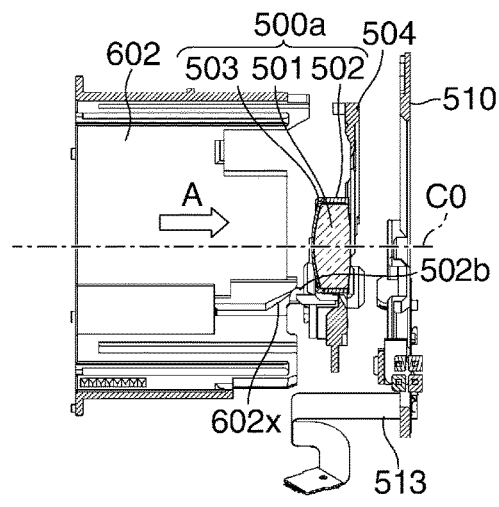
Figure 8A:
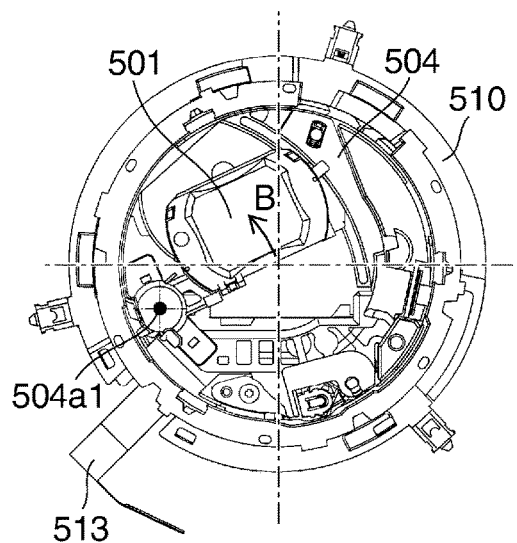
FIGS. 8A and 8C are front views showing the retractable lens group and the first straight advance cylinder.
Figure 8B:
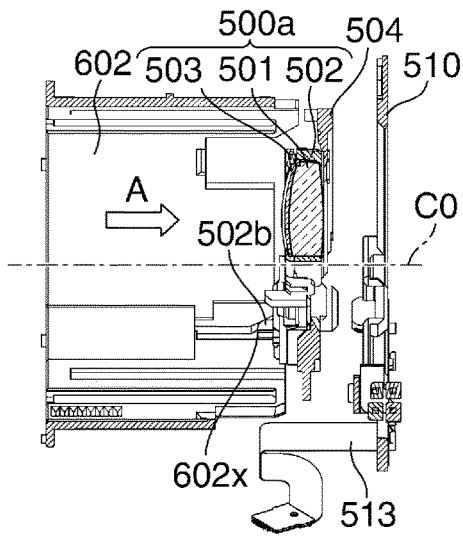
FIGS. 8B and 8D are longitudinal sectional views showing the retractable lens group and the first straight advance cylinder.
Figure 8C:
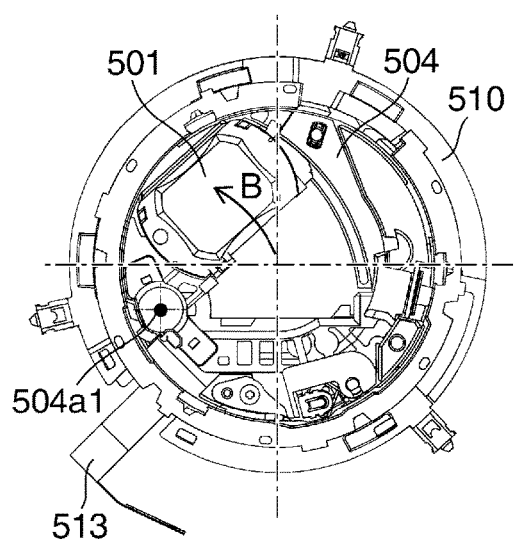
Figure 8D:
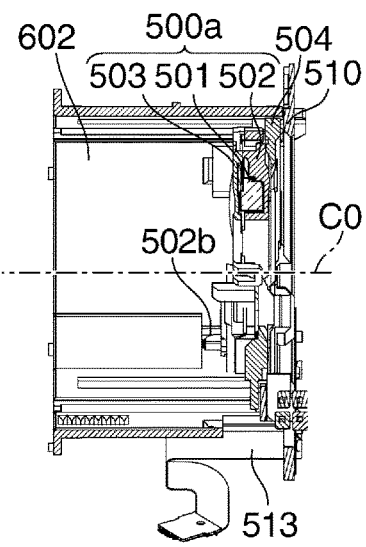

FIGS. 7A and 7B are a front view and a longitudinal sectional view, receptively, showing the retractable lens group 500a and the first straight advance cylinder 602. FIGS. 7C and 7D, FIGS. 8A and 8B, and FIGS. 8C and 8D as well as FIGS. 7A and 7B are a front view and a longitudinal sectional view, receptively, showing the retractable lens group 500a and the first straight advance cylinder 602. Referring to FIGS. 7A to 7D and FIGS. 8A to 8D, a description will be given of operation in a process of shifting from a shooting state to a collapsed state with emphasis on the retractable lens group 500a and the first straight advance cylinder 602. FIGS. 7A and 7B show a shooting state, FIGS. 7C and 7D and FIGS. 8A and 8B show a process of shifting from the shooting state to a collapsed state, and FIGS. 8C and 8D show the collapsed state.

Figure 9B:
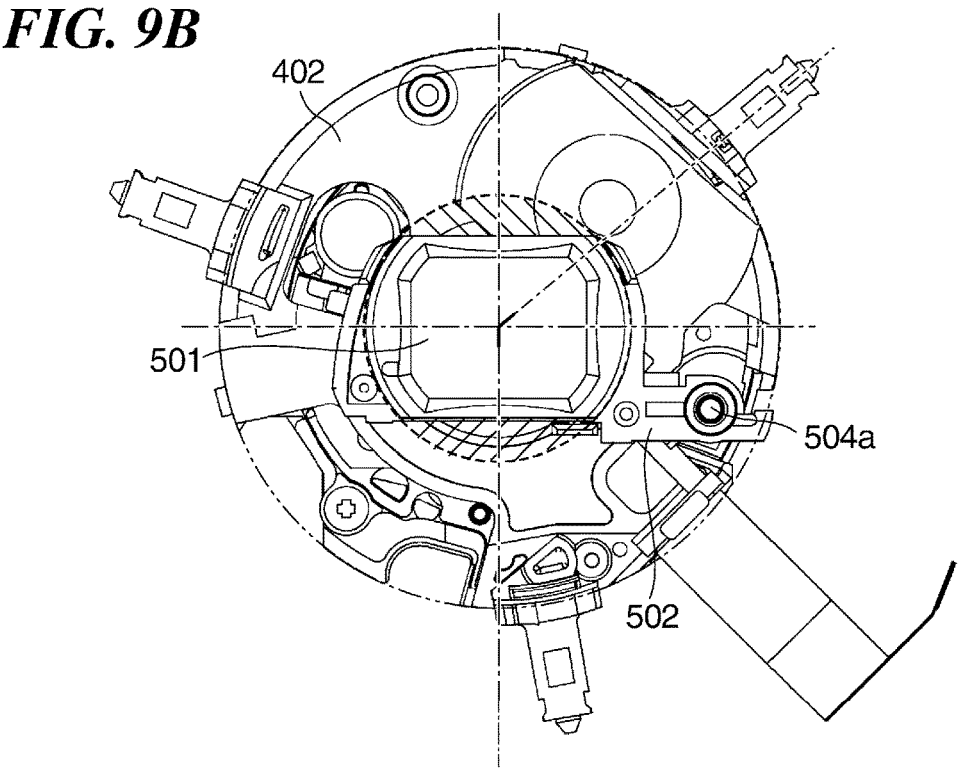
Figure 10A:
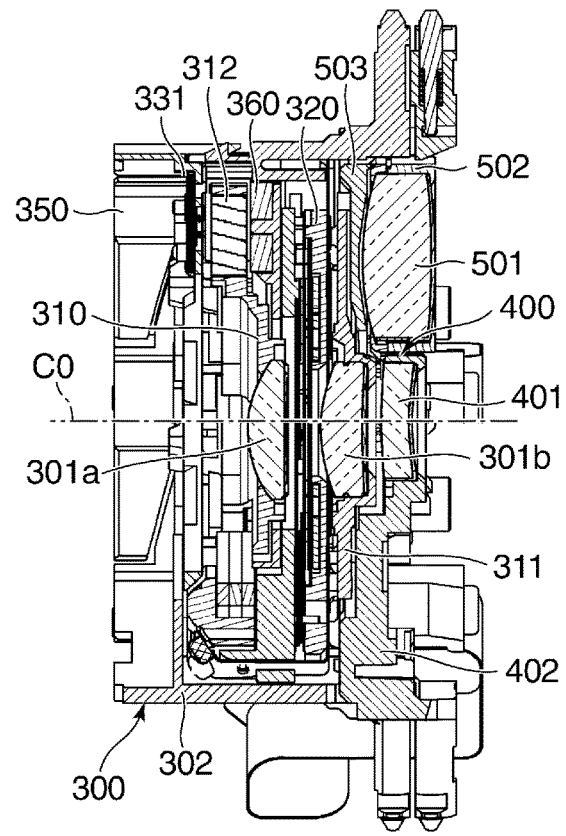
FIGS. 10A and 10B are a cross-sectional view and a rear view, respectively, showing the third to fifth lens groups in a collapsed state.
Figure 10B:
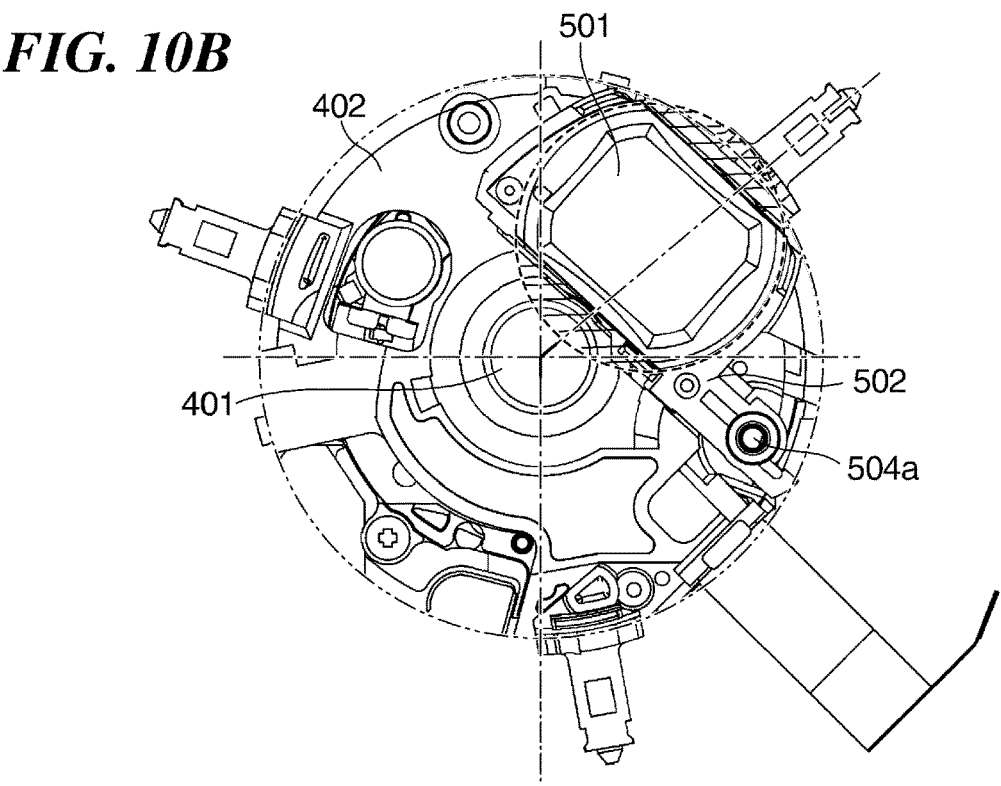

FIGS. 9A and 9B are a cross-sectional view and a rear view, respectively, showing the third lens group 300, the fourth lens group 400, and the fifth lens group 500 in a shooting state. FIGS. 10A and 10B are a cross-sectional view and a rear view, respectively, showing the third lens group 300, the fourth lens group 400, and the fifth lens group 500 in a collapsed state.

Figure 11:
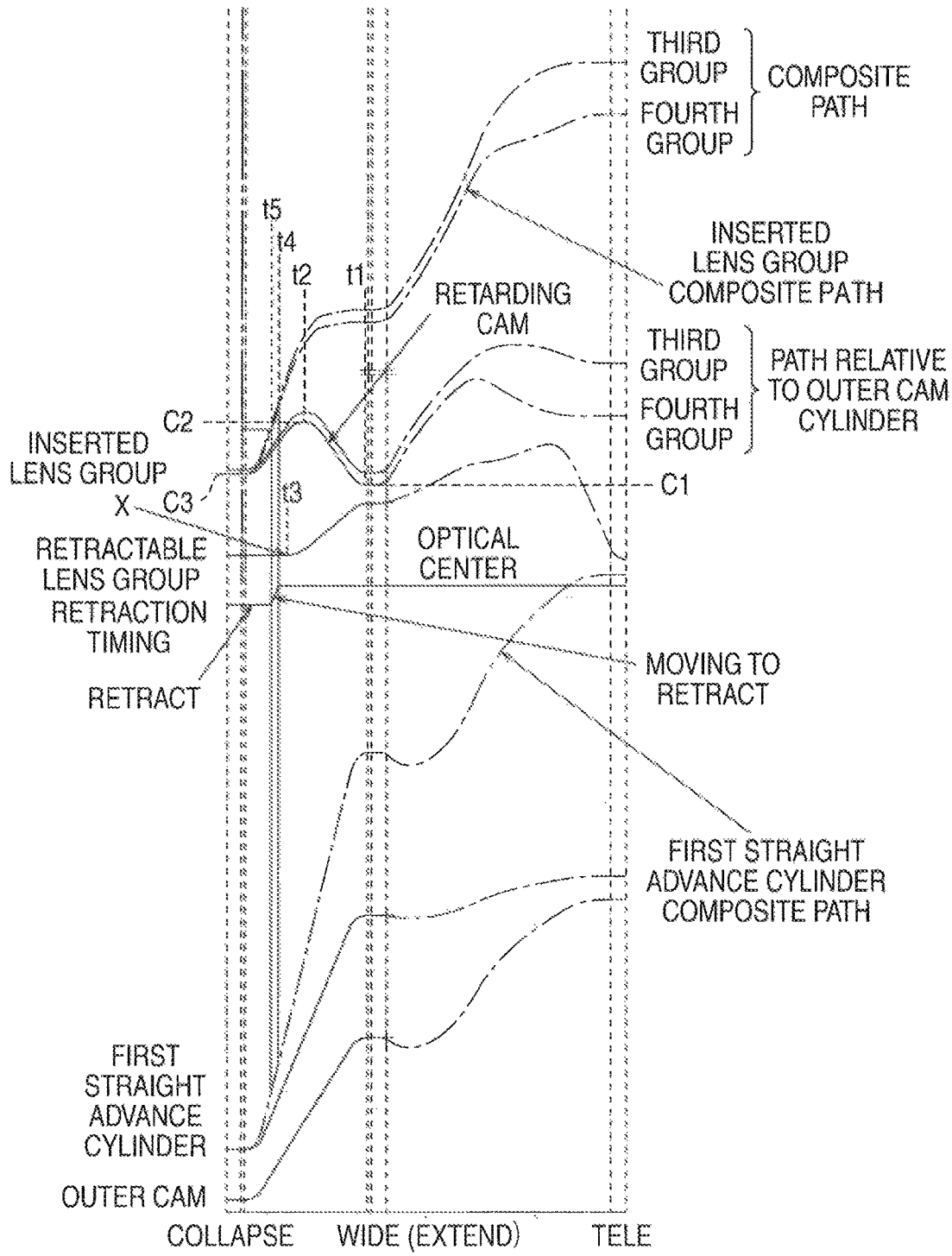
FIG. 11 is a timing chart showing how lens groups move.

FIG. 11 is a timing chart showing how the lens groups move. In a shooting state, a position at which the focal length of the shooting optical system is the shortest (wide-angle side) is a WIDE position, and a position at which the focal length of the shooting optical system is the longest (telephoto side) is a TELE position. In FIG. 11, the abscissa indicates the passage of time from the TELE position to the collapsed position. The ordinate indicates positions in the direction of the optical axis, and an upper part is an extended side (front).

In the process in which the lens barrel 20 shifts from the shooting state (FIGS. 7A and 7B, FIGS. 9A and 9B) to the collapsed state, first, mutual actions of the cylinders cause the first straight advance cylinder 602 to start moving in a direction indicated by an arrow A (rearward in the direction of the optical axis). The distance between the first straight advance cylinder 602 and the fifth lens group 500 then becomes smaller. As the movement in a collapsing direction proceeds, the cam portion 602x of the first straight advance cylinder 602 abuts against the corner portion 502b of the fifth lens frame 502, and the cam portion 602x drives the corner portion 502b (FIGS. 7C and 7D). In terms of the relationship between the cam portion 602x and the corner portion 502b, they are shaped such that when they are pressed against each other in the direction of the optical axis, a rotational moment about the axis 504a1 acts on the first straight advance cylinder 602. Thus, the cam portion 602x driving the corner portion 502b causes the retractable lens group 500a to start retracting while rotating about the axis 504a1 in a direction of a plane (direction indicated by an arrow B) perpendicular to the optical axis C0 (FIGS. 8A and 8B). A position at which the retractable lens group 500a lies when the cam portion 602x has abutted against the corner portion 502b in the process of shifting from the shooting state to the collapsed state is referred to as "the waiting position X" (see FIG. 11). An initial position of the retractable lens group 500a is shown in FIG. 7A. Thus, as seen in the direction of the optical axis, the waiting position X is the same as the initial position.

As the first straight advance cylinder 602 further moves rearward in the direction of the optical axis, the cam portion 602x driving the corner portion 502b causes the retractable lens group 500a to further rotate and arrive at a retracted position in the end (FIGS. 8C and 8D, FIGS. 10A and 10B). The retracted position is a position assumed by the retractable lens group 500a in a collapsed state and away from the optical axis C0 in a direction perpendicular to the optical axis C0. As shown in FIGS. 7A and 9B, in a shooting state, the retractable lens group 500a is held such that the optical axis of the retractable lens group 500a alone substantially corresponds to the optical axis C0 of the shooing optical system as a whole. On the other hand, in a collapsed state of the lens barrel 20, the optical axis of the retractable lens group 500a alone has shifted to a position eccentric from the optical axis C0 as shown in FIGS. 8B and 10B.

In the collapsed state, a part of the fourth lens group 400 is inserted into a space on the optical axis after the retractable lens group 500a has retracted. Specifically, the fourth lens 401, which is a part of the fourth lens group 400, goes into a lateral side of the retractable lens group 500a, and the retractable lens group 500a and the fourth lens 401 overlap each other in a direction perpendicular to the optical axis C0. This makes it possible to thin the lens barrel 20 in the direction of the optical axis in the collapsed state.

As for the timing with which the retractable lens group 500a retracts, after the retractable lens group 500a moves out of the center of the optical axis C0 to complete its retraction, the fourth lens group 400 needs to be collapsed and housed on a lateral side of the retractable lens group 500a. In a conventional normal design, cylinders and lens groups are generally arranged to be linearly displaced so as to quickly complete all operations in a collapsing operation. On this occasion, the distances between the lens groups and retracting and collapsing operations need to be properly designed so as to prevent the retractable lens group 500a and the fourth lens group 400, which is an inserted lens group, from interfering with each other by making timing appropriate. In the present embodiment, a twist is added mainly to operation of the fourth lens group 400. Moreover, since the third lens group 300 is disposed in proximity to the fourth lens group 400, the fourth lens group 400 operates similarly to the third lens group 300.

In the chart of FIG. 11, a left end indicates the positional relationship in a collapsed state in which the power to the image pickup apparatus is off. When the power is turned on in the collapsed state, the state of the lens barrel 20 shifts rightward in the chart to reach the WIDE position on the wide-angle side. In response to a photographer performs a zooming operation, the state of the lens barrel 20 shifts rightward in the chart from the WIDE position to reach the TELE position. A zoom position between the WIDE position and the TELE position can be selected through operation of a photographer. When the power is turned off in a shooting state, the state of the lens barrel 20 shifts leftward in the chart from a zoom position at that time and stops in the collapsed state at the left end.

Referring now to FIG. 11, a concrete description will be given of operation when the power to the image pickup apparatus in a shooting state is turned off. First, the AF base 502 including the retractable lens group 500a collapses and moves to a position close to the group-5 base 510. Next, the fifth lens group 500 (including the retractable lens group 500a) quickly moves in a collapsing direction from the present position to the waiting position X via the WIDE position. Before the entire lens barrel 20 arrives at a collapsed position, the fifth lens group 500 has completed its movement to the waiting position X (timing t3). In the process of shifting to a collapsing state, the cam portion 602x abuts against the corner portion 502b with timing t4 due to movement of the first straight advance cylinder 602. With the timing t4, the retractable lens group 500a starts rotation so as to retract, and with timing t5, the fifth lens group 500a arrives at a retracted position. The rotation of the retractable lens group 500a for retraction occurs after the retractable lens group 500a arrives at the waiting position X on the shooting optical axis. As a result, a retracting operation is performed without burdening the follower 510a of the fifth lens group 500 and others. Here, as viewed in the direction of the optical axis C0, the retractable lens group 500a always lies inside the first straight advance cylinder 602 even when the retractable lens group 500a lies at the retracted position. This reduces the thickness in the direction of the optical axis in the collapsed state and also prevents the outer diameter from increasing.

It is necessary to quickly move the first straight advance cylinder 602 in the collapsing direction so that the retractable lens group 500a can move first to the retracted position as fast as possible. The outer cam cylinder 701, the second straight advance cylinder 702, and the inner cam cylinder 601 should be quickly moved so as to quickly collapse the first straight advance cylinder 602. However, the third lens group 300 and the fourth lens group 400 follow the outer cam cylinder 701, and hence without adding any twist, the third lens group 300 and the fourth lens group 400 as well quickly move in response to quick linear movement of the outer cam cylinder 701. On the other hand, the fourth lens group 400 needs to move in the collapsing direction so as not to interfere with the retractable lens group 500a. Accordingly, in the present embodiment, the third lens group 300 and the fourth lens group 400 move in an extending direction relatively to the outer cam cylinder 701 while moving from the WIDE position to the collapsing state (retarding cam).

This retarding cam function is implemented by shapes of the cam grooves 701c and 701d (FIG. 2). Paths taken by the third lens group 300 and the fourth lens group 400 moving relatively to the outer cam cylinder 701 are illustrated by "paths of movement relative to outer cam cylinder" in FIG. 11. As for the relative movement, the third lens group 300 and the fourth lens group 400 lie at a rearmost relative position C1 of the WIDE position in the process of shifting to the collapsed state, and with the timing t1, they change their moving direction toward the front. With the timing t2, the third lens group 300 and the fourth lens group 400 lie at a foremost relative position C2 between the WIDE position and the collapsed position, and after that, move rearward to a relative position C3 corresponding to the collapsed position. The fourth lens group 400 temporarily moves forward in the direction of the optical axis relatively to the outer cam cylinder 701 and then moves in the collapsing direction. As a result, the outer cam cylinder 701 linearly collapses fast, whereas the fourth lens group 400 collapses after a certain delay time has elapsed. Thus, the outer cam cylinder 701 and the fourth lens group 400 differ in collapsing timing. Even without allowing any unnecessary leeway for the distance between the fourth lens group 400 and the retractable lens group 500a in the direction of the optical axis, the retractable lens group 500a is reliably retracted before the fourth lens group 400 is brought to the collapsed position.

In the relationship with the outer cam cylinder 701 in the direction of the optical axis, the relative position C3 assumed by the fourth lens group 400 in the collapsed state is the same as or ahead of the relative position C1 assumed by the fourth lens group 400 at the WIDE position. This secures long delay time in a collapsing action of the fourth lens group 400 and makes design that avoids interference easier. On the other hand, a composite path taken by the third lens group 300 and the fourth lens group 400 is a path taken by movement relative to the image pickup element 900. As for the positional relationship with the image pickup element 900, the fourth lens group 400 is displaced to the collapsed position (housed position) without being displaced forward in the direction of the optical axis relatively to the image pickup element 900 in the process of shifting from the shooting state to the collapsed state. As a result, the fourth lens group 400 never moves in an extending direction and thus does not take extra time or affects the operation of the other lens groups such as the second lens group 200 and the first lens group 100. Thus, an excessively long delay in shifting to the collapsed state is prevented, and also, the effects on operation of the other lens groups are reduced.

With the arrangement described above, the first straight advance cylinder 602 which retracts the retractable lens group 500a is collapsed in advance, and the fourth lens group 400 which is inserted into a lateral side of the retractable lens group 500a is collapsed with a delay. As a result, the collapsing operation is smoothly and efficiently performed without adding any components or taking time.

According to the present embodiment, in the process of shifting to the collapsed state, the fourth lens group 400 moves forward in the direction of the optical axis relatively to the outer cam cylinder 701 with earlier timing (t1 to t2) than the timing t4 with which the retractable lens group 500a starts to be displaced in a direction perpendicular to the optical axis so as to retract. Then, the fourth lens group 400 is brought to the housed position corresponding to the collapsed state with timing later than the timing t5 with which the retractable lens group 500a arrives at the retracted position. As a result, without increasing the thickness in the direction of the optical axis or causing interference between the lens groups, the retractable lens group 500a is reliably retracted before the adjoining lens group (the fourth lens group 400) is housed.

Moreover, in the process of shifting to the collapsed state, the retractable lens group 500a starts to be displaced while rotating so as to retract after the timing t2 with which the fourth lens group 400 is displaced to the foremost position in the direction of the optical axis C0 relatively to the outer cam cylinder 701. This reliably retracts the retractable lens group 500a. Further, since in the process of shifting to the collapsed state, the fourth lens group 400 is displaced to the housed position without being displaced forward relatively to the image pickup element 900, shifting to the collapsed state is prevented from being delayed, and also, the effects on operation of the other lens groups are reduced.

Additionally, since in the process of shifting to the collapsed state, the retractable lens group 500a is displaced to the retracted position while rotating after arriving at the waiting position X, no unnecessary load is put on the retractable lens group 500a. Further, since the outer cam cylinder 701 and the first straight advance cylinder 602 are caused to move by the zoom driving unit 810 driving the rotary cylinder 801, that is, the outer cam cylinder 701 and the first straight advance cylinder 602 are driven by a common driving source, arrangements associated with driving sources do not become complicated.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-006093, filed Jan. 15, 2016 which is hereby incorporated by reference herein in its entirety.

What is claimed is:

1. A lens barrel comprising:
a first holding member of an inserted lens group, configured to hold an inserted lens;
a cam cylinder configured to drive said first holding member in a direction of an optical axis by a cam mechanism; and
a second holding member of a retracting lens group located immediately adjacent to the inserted lens group along the optical axis, and configured to hold a retracting lens disposed closer to an image plane than the inserted lens,
wherein at a shooting position, said second holding member is configured to lie on the optical axis, and during a process of retracting, said second holding member retracts to a retracted position away from the optical axis in a direction perpendicular to the optical axis in response to movement of said cam cylinder toward the image plane, and
wherein a cam groove is formed on the cam cylinder, said groove is configured to move the first holding member in a direction toward a subject relatively to the cam cylinder so that the first holding member does not interfere with said second holding member during a process of retracting the lens barrel from a WIDE position to the collapsed position before said second holding member starts retracting to the retracted position as part of the process of retracting the lens barrel from the WIDE position to the collapsed position.

2. The lens barrel according to claim 1, wherein in the process of shifting from the shooting position to the collapsed position, said second holding member starts retracting to the retracted position after said first holding member has moved to a position closest to the subject relatively to the outside cam cylinder.

3. The lens barrel according to claim 1, wherein in the process of shifting from the shooting position to the collapsed position, said first holding member moves to a position on the optical axis, adjacent to a collapsed position to which said second holding member has retracted, without moving toward the subject relatively to an image pickup element.

4. The lens barrel according to claim 1, wherein in the process of shifting from the shooting position to the collapsed position, said second holding member moves to a waiting position on the optical axis and then moves in a direction perpendicular to the optical axis to arrive at the retracted position.

5. The lens barrel according to claim 1, wherein the moving member is a straight advance cylinder that is disposed on an inner peripheral side of said cam cylinder and caused to move in the direction of the optical axis by rotation of the outside cam cylinder, and
wherein in the process of shifting from the shooting position to the collapsed position, said second holding member moves to the retracted position by engaging with a straight advance cylinder that is caused to move toward the image plane by rotation of said cam cylinder.

6. The lens barrel according to claim 1, wherein in a relationship with the outside cylinder in the direction of the optical axis, a position assumed by said first holding member at the collapsed position is the same as or closer to the subject than a position assumed by said first holding member at a shooting position at which a focal length is the shortest.

7. The lens barrel according to claim 1, further comprising:
   a first driving unit configured to drive said cam cylinder; and
   a second driving unit configured to drive said second holding member in the direction of the optical axis independently of said first driving unit,
   wherein a rack that constitutes said second holding member is fitted on a screw formed integrally with an output shaft of a motor that constitutes said second driving unit.

8. The lens barrel according to claim 1, wherein after said second holding member retracts from the optical axis, said first holding member moves to a position on the optical axis from which said second holding member has retracted.

9. The lens barrel in accordance with claim 1, wherein the groove is further configured to, after moving the first holding member in the direction toward the subject relatively to the outside came cylinder, subsequently move the first holding member in an opposite direction toward the image plane relatively to the outside cam cylinder during the process of retracting the lens barrel from the shooting position to the collapsed position.

10. An image pickup apparatus with a lens barrel, wherein the lens barrel comprises:
   a first holding member of an inserted lens group that holds an inserted lens;
   a cam cylinder configured to drive the first holding member in a direction of an optical axis by a cam mechanism; and
   a second holding member of a retracting lens group located immediately adjacent to the inserted lens group along the optical axis, and configured to hold a retracting lens disposed closer to an image plane than the inserted lens,
   wherein at a shooting position, said second holding member is configured to lie on the optical axis, and during a process of retracting, said second holding member retracts to a retracted position away from the optical axis in a direction perpendicular to the optical axis in response to movement of said cam cylinder toward the image plane, and
   wherein a cam groove is formed on the cam cylinder, said groove is configured to move the first holding member in a direction toward a subject relatively to the cam cylinder so that the first holding member does not interfere with said second holding member during a process of retracting the lens barrel from a WIDE position to the collapsed position before said second holding member starts retracting to the retracted position as part of the process of retracting the lens barrel from the WIDE position to the collapsed position.

11. The lens barrel in accordance with claim 10, wherein the groove is further configured to, after moving the first holding member in the direction toward the subject relatively to the outside came cylinder, subsequently move the first holding member in an opposite direction toward the image plane relatively to the outside cam cylinder during the process of retracting the lens barrel from the shooting position to the collapsed position.

* * * * *